United States Patent [19]

Aisa et al.

[11] Patent Number: 4,857,188

[45] Date of Patent: Aug. 15, 1989

[54] IRON POWDER ATTRACTING MAGNET

[75] Inventors: Junzo Aisa; Eizi Kosugi, both of Shizuoka, Japan

[73] Assignee: Ishikawa Tekko Kabushiki Kaisha, Tokyo, Japan

[21] Appl. No.: 182,858

[22] Filed: Apr. 18, 1988

[30] Foreign Application Priority Data

May 12, 1987 [JP] Japan .................. 62-115300

[51] Int. Cl.$^4$ .................. B01D 35/06; F01M 1/10
[52] U.S. Cl. .................. 210/222; 210/695; 184/6.25
[58] Field of Search .................. 210/222, 223, 695; 184/6.25

[56] References Cited

U.S. PATENT DOCUMENTS

| | | | |
|---|---|---|---|
| 2,959,287 | 11/1960 | Davis et al. | 210/222 |
| 2,999,275 | 9/1961 | Blume | 210/222 |
| 3,024,392 | 3/1962 | Baermann | 210/222 |
| 3,151,703 | 10/1964 | Benk | 210/222 |
| 3,959,145 | 5/1976 | Lundquist et al. | 210/223 |
| 4,082,656 | 4/1978 | Hedvall et al. | 210/222 |
| 4,564,448 | 1/1986 | O'Meara | 210/695 |
| 4,605,498 | 8/1986 | Kulish | 210/695 |

Primary Examiner—Richard V. Fisher
Assistant Examiner—Cynthia L. Nessler
Attorney, Agent, or Firm—James E. Nilles; Thomas F. Kirby

[57] ABSTRACT

An iron powder attracting magnet, wherein a plurality of spaces are formed to open to an iron powder attracting surface and partitioned by a partition for attracting and removing iron powder contained in a fluid. The iron powder attracting magnet is made of a magnetic material which is prepared by impregnating a strontium ferrite into a synthetic resin.

5 Claims, 3 Drawing Sheets

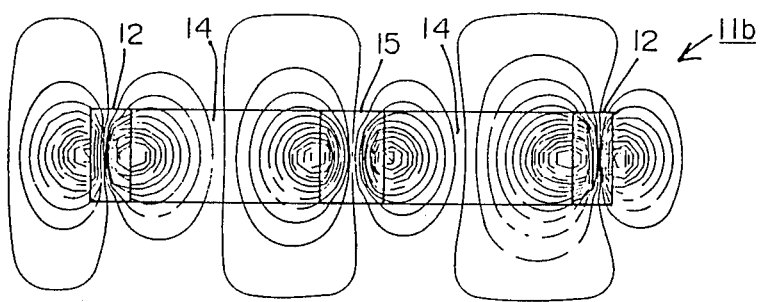
FIG. 4
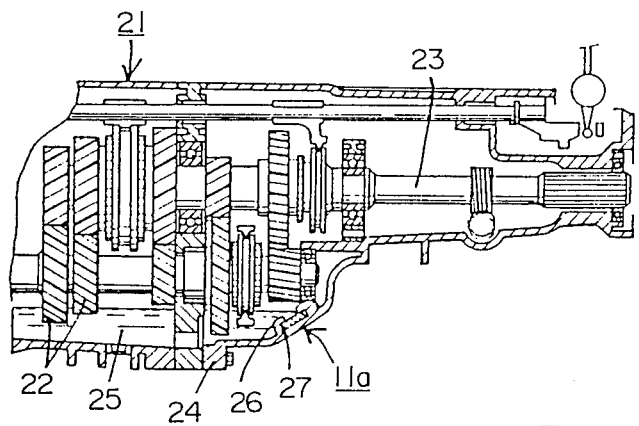
FIG. 5
FIG. 6
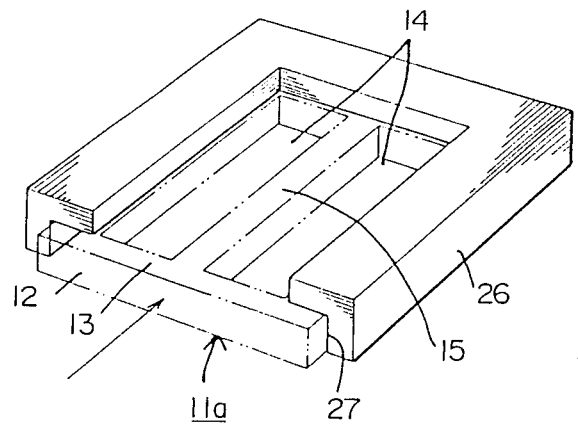

IRON POWDER ATTRACTING MAGNET

BACKGROUND OF THE INVENTION

1. Field of the Invention

The present invention relates to an iron powder attracting magnet for attracting and removing iron powder contained in a fluid such as a liquid.

2. Description of the Prior Art

In a transmission or a differential gear to be used in an automobile or an industrial vehicle, for example, oil is used for lubrication so as to prevent a plurality of gears for drive power transmission from seizing and wearing. As the running time elapses, the gears will wear so that the resultant iron powder will mix into the oil. This iron powder will raise problems to wear the gears abnormally and to accelerate the aging of the oil. Efforts have been made to solve those problems by mounting an iron powder attracting magnet in a transmission case or a gear case which accommodates the gears and stores the oil, to attract and remove the iron powder from the oil.

As shown in FIGS. 7 and 8, iron powder attracting magnets 1a and 1b existing in the prior art have rectangular or disc shapes and are made of a sintered magnetic material. These magnets 1a and 1b have their upper surfaces 2 act as iron powder attracting surfaces to attract and remove the iron powder.

Since the iron powder attracting magnets of the prior art are made of a sintered magnetic material, as described above, they are heavy and liable to crack, chip or break. From the molding restrictions, the magnets cannot be molded into other than the simple shapes such as the rectangular or disc shapes, as shown in FIGS. 7 and 8. Thus, the magnets have a small degree of freedom of the shapes, a low sizing accuracy and a restriction upon the attracting ability.

SUMMARY OF THE INVENTION

An object of the present invention is to provide an iron powder attracting magnet which can be lightened without lowering the iron powder attractability and can be formed into an arbitrary shape with an excellent sizing accuracy.

According to the present invention, there is provided an iron powder attracting magnet which is made by molding a magnetic material of a synthetic resin and includes: a plurality of spaces opened to an iron powder attracting surface; and a partition partitioning said spaces.

By using a synthetic resin as the magnetic material, the iron powder attracting magnet of the present invention can be molded into a shape having a plurality of spaces, by which a surface area is increased and a magnetic field for attracting the iron powder is exerted to effectively attract the iron powder.

The other objects and features of the present invention will become apparent from the following description with reference to the accompanying drawings.

BRIEF DESCRIPTION OF THE DRAWINGS

FIG. 4 is a diagram showing the analyzed magnetic field of the iron powder attracting magnet of the second embodiment;

FIG. 5 is a section showing a transmission using the iron powder attracting magnet;

FIG. 6 is a perspective view showing the mounted state of the iron powder attracting magnet.

DESCRIPTION OF THE PREFERRED EMBODIMENTS

Figure 1:
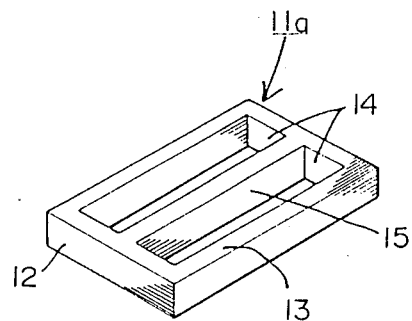
FIG. 1 is a perspective view showing an iron powder attracting magnet according to a first embodiment of the present invention.
Figure 7:
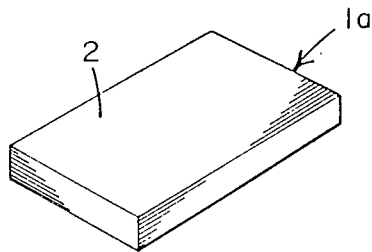
FIGS. 7 and 8 are perspective views showing the iron powder attracting magnets of the prior art.

In FIG. 1, there is shown a first embodiment of the present invention, which is sized and shaped according to the iron powder attracting magnet 1a having been described in connection with the prior art with reference to FIG. 7. An iron powder attracting magnet 11a is made of a magnetic material of a synthetic resin, which is prepared by impregnating a magnetic material of strontium ferrite into a synthetic resin such as nylon. The magnet 11a is formed into a rectangular shape by a rectangular frame 12 formed therein with a pair of rectangular spaces 14 opened to upper and lower surfaces 13, which are partitioned by a partition 15 to provide upper and lower regions of N and S poles, respectively.

Figure 2:
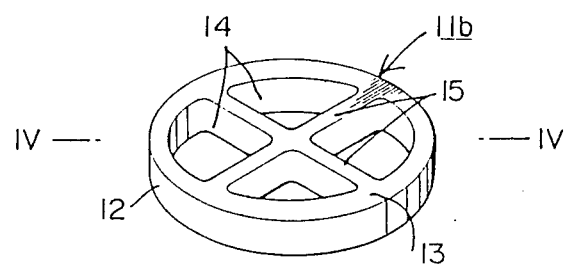
FIG. 2 is a perspective view showing a second embodiment.
Figure 8:
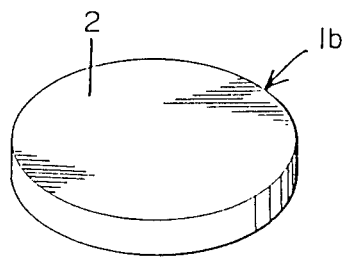

In FIG. 2, on the other hand, there is shown a second embodiment which is sized and shaped according to the iron powder attracting magnet 1b having been described in connection with the prior art with reference to FIG. 8. An iron powder attracting magnet 11b is also made of a magnetic material of a synthetic resin, which is prepared by impregnating a magnetic material of strontium ferrite into a synthetic resin such as nylon. The magnet 11b is formed into a disc shape by an annular frame 12 formed therein with a plurality of sector spaces 14 opened to upper and lower surfaces 13, which are partitioned by perpendicularly crossing particles 15 to provide upper and lower regions of N and S poles, respectively.

Moreover, the iron powder attracting magnets 11a and 11b of the aforementioned respective embodiments are made of a material of the synthetic resin so that they are resistant against impact, tension and bending and are not likely to crack, chip or break. Thus, the magnets 11a and 11b can be easily molded highly accurately into complicated shapes. Still moreover, the magnets 11a and 11b are free from changes in shape and magnetic force when they are used in a transmission or the like at normal service temperature as will be described later.

The comparisons between the iron powder attracting magnets 11a and 11b of the above embodiments and the iron powder attracting magnets 1a and 1b made of the sintered magnetic material according to the prior art will be enumerated in the following table:

| Iron Powder Attracting Magnets | | |
|---|---|---|
| | Sintered | Molded of Synthetic Resin |
| Shape | Small Freedom → Simple | Large Freedom → Complex |

-continued

| | Iron Powder Attracting Magnets | | |
|---|---|---|---|
| | Low Sizing Accuracy | High Sizing Accuracy | |
| | Magnet 1a → 27 g | Magnet 11a → | 10 g |
| | Magnet 1b → 43 g | Magnet 11b → | 14 g |
| Weight | | Magnet 11a → | Reduction of 17 g (63%) |
| | | Magnet 11b → | Reduction of 29 g (67%) |
| | Magnet 1a → 950–1,000 gausses | Magnet 11a → | 930–960 gausses (on Surface) |
| Density of | Magnet 1b → 1400–1450 gausses | | 200–220 gausses (at Space Center) |
| Magnetic | | | |
| Flux on | | Magnet 11b → | 740–800 gausses (on Surface) |
| Surface | | | 200–220 gausses (at Space Center) |
| Amount of Iron | Magnet 1a → 21.7 g | Magnet 11a → | 21.7 g |
| Powder | | | |
| Attracted | Magnet 1b → 27.3 g | Magnet 11b → | 31 g |

Incidentally, the above comparisons are accomplished by giving the same respective external sizes to the corresponding magnets of the rectangular or disc shape and by using the upper surface 2 of the iron powder attracting magnets 1a and 1b and the upper surface 13 (including the inner sides facing the spaces 14) of the iron powder attracting magnets 11a and 11b as the iron powder attracting surfaces.

First of all, in terms of the shape, the magnets made of the sintered magnetic material have a small degree of freedom in shape so that their shapes are restricted to simple ones with a low sizing accuracy because of their molding characteristics. In the case of the magnetic material of the synthetic resin, on the other hand, the magnets can be easily molded just as with usual synthetic resin and have a large degree of freedom in shape so that they can be formed into such a complex shape as to increase the iron powder attractability and to permit flexibility in mounting place and manner with a high sizing accuracy.

In terms of weight, on the one hand, the magnets made of the sintered magnetic material have a weight of 27 g in the case of the rectangular magnet 1a and a weight of 43 g in the case of the disc magnet 1b. Since, on the other hand, the molded magnets of the synthetic resin are lighter because of their lighter material and several spaces 14 formed therein, the rectangular magnet 11a is as light as 10 g, and the disc magnet 11b is as light as 14 g. This means that the rectangular shape has the weight reduced by 17 g whereas the disc shape has the weight reduced by 29 g, or 63 and 67% reduction.

In terms of density of the magnetic flux on the surface, in the case of the sintered magnetic material, the iron powder attracting magnet 1a having the rectangular shape has a density of 950 to 1,000 gausses whereas the iron powder attracting magnet 1b having the disc shape has a density of 1,400 to 1,450 gausses. In the case of the magnetic synthetic resin, on the other hand, the rectangular-shaped iron powder attracting magnet 11a has density of 930 to 960 gausses on the surface and 200 to 220 gausses at the center of the spaces 14 whereas the disc-shaped iron powder attracting magnet 11b has density of 740 to 800 gausses on the surface and 200 to 220 gausses at the center of the spaces 14. This means that only a small reduction occurs in the density of magnetic flux. Here, the reason why the magnetic fluxes are generated in the spaces 14 is that the individual magnetic fields of the frame 12 and the partitions 15 of the iron powder attracting magnet 11b act as inverse magnetic fields in the individual spaces 14, as seen from the analytic diagram of the magnetic fields of FIG. 4 (which presents the sectional view taken on line IV—IV of the iron powder attracting magnet 11b and is similar to that of the other magnet 11a). The magnetic forces at the respective centers of the inverse magnetic fields in the spaces 14 are as high as 200 to 220 gausses in terms of the values of inverse magnetic poles, which are sufficient for attracting the iron powder.

In terms of the amounts of the iron powder attracted, the rectangular-shaped magnet 1a of the sintered magnetic material has an amount of 21.7 g whereas the disc-shaped magnet 1b has an amount of 27.3 g. In the case of the molded magnets of the synthetic resin, on the other hand, the formation of the spaces 14 increases the surface area such that the disc-shaped magnet 11b provides an increased amount of 31 g although the rectangular magnet 11a provides a substantially equal amount of 21.7 g.

In terms of the amounts of the iron powder attracted, moreover, the iron powder can be collected toward and stored at the centers of the spaces 14 by the actions of the aforementioned inverse magnetic fields generated in the spaces 14. This storage of the iron powder in the spaces 14 allows the magnets to exhibit a higher attractability than the prior art in which the iron powder is attracted only by one side of each of the surfaces.

Figure 3:
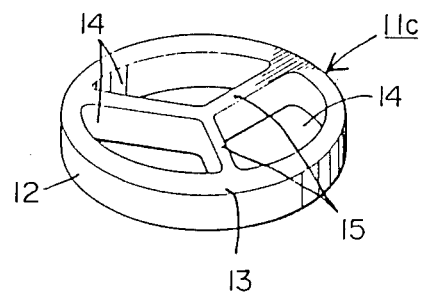
FIG. 3 is a perspective view showing a third embodiment.

The shape may be modified, as in a third embodiment shown in FIG. 3, such that a disc-shaped iron powder attracting magnet 11c is molded to have its inside partitioned into three spaces 14 of the same size by partitions 15. The magnet shape may be further modified by arbitrarily setting the external shape and the shape, size and the number of the spaces 14. These modifications can be made tailored to any shape because the magnets are molded of the synthetic resin, as has been described hereinbefore.

Therefore, the iron powder attracting magnets 11a, 11b, and 11c, include a magnet having opposite sides and a periphery and further having a plurality of unconnected spaces located inwardly of the periphery and opening to the opposite sides so as to define a partition between each pair of adjacent spaces, where the number of spaces equal the number of partitions, and so as to define an outer frame portion located between each space and the outer periphery, all surfaces of the magnetic surfaces capable of removing iron powder contained in fluid in contact with magnet, each outer frame portion and each partition exhibiting a magnetic field, and, with respect to a given space, the outer frame portion confronting the given space exhibits a polarity in the given space which is opposite to the polarity in the given space exhibited by the partition confronting the given space. Each partition may have one end connected to the outer frame portion of the magnet and the other end connected to the other partitions.

Turning to FIGS. 5 and 6, the use of the iron powder attracting magnet 11a (or the magnets 11b and 11c of the other embodiments) will be described in the following. FIG. 6 shows a transmission 21 for an automobile or other industrial vehicles, in which the rotations of an engine are transmitted in a variable speed through various gears 22 to a drive shaft 23. A case 24 for accommodating those gears 22 and drive shaft 23 is charged with oil 25 for lubricating the gears 22 to prevent the same from seizing or wearing. Here, the iron powder attracting magnet 11a is fitted in a mounting groove 27 of a mounting frame 26, which is formed in a position immersed in the oil 25 at the bottom of the case 24. Thus, the magnet 11a is in direct contact with the oil 25 so that it attracts and removes the iron powder which is generated due to the wear of the gears 22 and contained in the oil 25, to prevent the gears 22 from abnormal wear and the oil 25 from aging. Incidentally, the iron powder attracting magnet 11a may be mounted on the case 24 by means of mounting fittings or bolts.

In addition, the use of this magnet 11a should not be limited to the transmission 21 but can be applied to a differential gear or the like.

By using a synthetic resin as the material for the iron powder attracting magnet, according to the present invention, the magnet can be lightened and formed into an arbitrary complicated shape having a plurality of spaces with high sizing accuracy. Moreover, the spaces can retain a sufficient surface area and can establish magnetic fields therein for attracting the iron powder so that the iron powder attractability can be enhanced to attract and remove the iron powder very effectively.

What is claimed is:

1. As an article of manufacture, a magnet for attracting and removing iron powder contained in a fluid, said magnet comprising magnetic material embedded in solidified plastic material, said magnet having opposite sides and a periphery and further having a plurality of unconnected spaces located inwardly of said periphery and opening to said opposite sides so as to define a partition between each pair of adjacent spaces and so as to define an outer frame portion located between each space and said outer periphery, all surfaces of said magnet being magnetic surfaces capable of attracting and removing iron powder contain in fluid in contact therewith, each outer frame portion and each partition exhibiting a magnetic field, and wherein, with respect to a given space, the outer frame portion confronting said given space exhibits a polarity in said given space which is opposite to the polarity in said given space exhibited by the partition confronting said given space.

2. An article of manufacture according to claim 1 wherein said magnet comprises two of said spaces and one partition.

3. An article of manufacture according to claim 1 wherein the number of said spaces equals the number of partitions and wherein each partition has one end connected to said outer frame portion of said magnet and has its other end connected to the other partitions.

4. An article of manufacture according to claim 1 wherein said magnetic material comprises strontium ferrite.

5. An article of manufacture according to claim 4 wherein said plastic material comprises a synthetic resin.

* * * * *